US012531910B2

(12) United States Patent
Wenzel et al.

(10) Patent No.: US 12,531,910 B2
(45) Date of Patent: Jan. 20, 2026

(54) CYBERSECURITY CONFIGURATION IN A CLOUD ENVIRONMENT

(71) Applicant: Sophos Limited, Abingdon (GB)

(72) Inventors: Jean Pierre Wenzel, Weingarten (DE); Nicolas Aleksander Dürr, Linkenheim (DE)

(73) Assignee: Sophos Limited, Abingdon (GB)

( * ) Notice: Subject to any disclaimer, the term of this patent is extended or adjusted under 35 U.S.C. 154(b) by 136 days.

(21) Appl. No.: 18/240,784

(22) Filed: Aug. 31, 2023

(65) Prior Publication Data
US 2024/0080343 A1  Mar. 7, 2024

(30) Foreign Application Priority Data

Sep. 1, 2022 (GB) ...................................... 2212728
Aug. 30, 2023 (GB) ...................................... 2313211

(51) Int. Cl.
H04L 9/40 (2022.01)
H04L 41/16 (2022.01)

(52) U.S. Cl.
CPC .............. H04L 63/20 (2013.01); H04L 41/16 (2013.01)

(58) Field of Classification Search
CPC .................................. H04L 63/20; H04L 41/16
See application file for complete search history.

(56) References Cited

U.S. PATENT DOCUMENTS

| 2015/0172321 | A1 | 6/2015 | Kirti et al. |
| 2019/0021004 | A1* | 1/2019 | Shanmugavadivel ....................... H04W 12/08 |
| 2019/0319987 | A1* | 10/2019 | Levy ....................... H04L 63/08 |
| 2019/0320298 | A1* | 10/2019 | Shaw .................... H04W 48/18 |
| 2022/0156372 | A1* | 5/2022 | Harang ................... G06F 21/56 |
| 2022/0247769 | A1 | 8/2022 | Erlingsson et al. |

(Continued)

FOREIGN PATENT DOCUMENTS

CN  111176755  5/2020

OTHER PUBLICATIONS

Henze (Accounting for Privacy in the Cloud Computing Landscape, Reports on Communications and Distributed Systems, vol. 17, 2018, 313 pages) (Year: 2018).*

(Continued)

Primary Examiner — Oleg Korsak
(74) Attorney, Agent, or Firm — Strategic Patents, P.C.

(57) ABSTRACT

The present teachings include automatically determining the recommended security configuration of a first cloud service within a cloud computing network. This may include detecting a change in the cloud computing network relating to a second cloud service being deployed within the cloud computing network, and in response, obtaining contextual information related to the configuration and operation of the first cloud service, the contextual information including information related to the second cloud service. The contextual information may be provided to a prediction model operable to identify a security posture from input contextual information for obtaining a recommended security posture from the prediction model based on the contextual information provided thereto. Aspects may further include determining a security recommendation for the first cloud service based on a comparison of a current security posture of the first cloud service and the recommended security posture.

20 Claims, 9 Drawing Sheets

(56) References Cited

U.S. PATENT DOCUMENTS

| | | | |
|---|---|---|---|
| 2022/0311804 A1* | 9/2022 | Talati | H04L 63/205 |
| 2022/0311805 A1* | 9/2022 | Talati | H04L 63/20 |
| 2023/0123781 A1* | 4/2023 | Kaimal | H04L 41/0893 |
| | | | 726/12 |
| 2023/0336591 A1* | 10/2023 | Jones | H04L 63/10 |

OTHER PUBLICATIONS

Alavizadeh, Hootan et al., "Cyber Situation Awareness Monitoring and Proactive Response for Enterprises on the Cloud", 2020 IEEE 19th International Conference on Trust, Security and Privacy in Computing and Communications (TrustCom) 2020, 9 pages.

An, Seongmo, "CloudSafe: A Tool for an Automated Security Analysis for Cloud Computing", 2019 18th IEEE International Conference on Trust, Security and Privacy in Computing and Communications/13th IEEE International Conference On Big Data And Engineering 2019, pp. 602-609.

UKIPO, , "UK Application No. GB2212728.6, Combined Search and Examination Report under Sections 17 and 18(3) mailed Apr. 24, 2023", , 11 pages.

UKIPO, "UK Application No. 2313211.1 Search and Examination Report mailed Feb. 19, 2024", 7 pages.

UKIPO, "UK Application No. 2313211.1 Examination Report mailed Jan. 10, 2025", 3 pages.

\* cited by examiner

CYBERSECURITY CONFIGURATION IN A CLOUD ENVIRONMENT

CROSS-REFERENCE TO RELATED APPLICATIONS

This application claims priority to United Kingdom Pat. App. No. 2313211.1 filed on Aug. 30, 2023, and United Kingdom Pat. App. 2212728.6 filed on Sep. 1, 2022, where each of the foregoing is incorporated herein by reference in its entirety.

FIELD

The present disclosure generally relates to systems and methods for the automatic configuration of security settings within a cloud environment. Specifically, but not exclusively, the present disclosure relates to the use of artificial intelligence to provide recommended improvements to the security settings of a cloud service.

BACKGROUND

Many enterprises are increasingly relying on cloud computing resources to provide some if not all workload capabilities. With the increasing complexity of such cloud computing environments, there is a need to determine appropriate security settings and configurations in an efficient and effective manner to improve the security of an enterprise's cloud computing infrastructure and to reduce the potential negative impact of malicious attacks.

SUMMARY

According to one aspect of the present disclosure, there is provided a computer-implemented method for automatically determining the recommended security configuration of a first cloud service deployed within a cloud computing network. The method comprises: detecting a change in the cloud computing network, wherein the change relates to a second cloud service being deployed within the cloud computing network; in response to the change being detected, obtaining contextual information related to the configuration and operation of the first cloud service, wherein the contextual information comprises information related to the second cloud service; providing the contextual information to a prediction model operable to identify a security posture from input contextual information; obtaining a recommended security posture from the prediction model, wherein the recommended security posture is based on the contextual information provided to the prediction model; and determining a security recommendation for the first cloud service based on a comparison of a current security posture of the first cloud service and the recommended security posture.

Optionally, but preferably, the computer-implemented method further comprises causing an action based on the security recommendation. Additionally, or alternatively, the action comprises blocking network traffic received from the second cloud service at the first cloud service. Additionally, or alternatively, the action comprises isolating the second cloud service within the cloud computing network. Additionally, or alternatively, the action comprises redeploying the second cloud service. Additionally, or alternatively, the action comprises presenting an output based on the security recommendation.

Optionally, the contextual information comprises network traffic information related to network activity of the first cloud service. Optionally, the network traffic information comprises information related to network activity between the first cloud service and the second cloud service Additionally, or alternatively, the contextual information comprises health state information related to heartbeat response indicators associated with the second cloud service.

Optionally, but preferably, obtaining contextual information comprises obtaining first contextual information from an agent deployed within the cloud computing network. Optionally, the method further comprises deploying the agent within the first cloud service. Optionally, obtaining contextual information comprises obtaining second contextual information from a cloud management service associated with the first cloud service. Optionally, the agent is deployed within the first cloud service based at least in part on the second contextual information obtained from the cloud management service.

Optionally, but preferably, the prediction model comprises a machine learning model trained using training data. Optionally, the training data comprises contextual information and associated security postures extracted from a plurality of cloud services.

According to a further aspect of the present disclosure, there is provided a computer program product for automatically determining the recommended security configuration of a first cloud service deployed within a cloud computing network. The computer program product comprises a non-transitory computer readable medium having stored thereon computer executable code that, when executed by one or more processors, perform steps comprising: detecting a change in the cloud computing network, wherein the change relates to a second cloud service being deployed within the cloud computing network; in response to the change being detected, obtaining contextual information related to the configuration and operation of the first cloud service, wherein the contextual information comprises information related to the second cloud service; providing the contextual information to a prediction model operable to identify a security posture from input contextual information; obtaining a recommended security posture from the prediction model, wherein the recommended security posture is based on the contextual information provided to the prediction model; and determining a security recommendation for the first cloud service based on a comparison of a current security posture of the first cloud service and the recommended security posture.

According to an additional aspect of the present disclosure, there is provided a system for automatically determining the recommended security configuration of a first cloud service deployed within a cloud computing network. The system comprises a recommendation unit comprising one or more processors; a memory for storage of computer-readable data; and computer executable code stored in the memory and executable by the one or more processors to perform steps comprising: detecting a change in the cloud computing network, wherein the change relates to a second cloud service being deployed within the cloud computing network; in response to the change being detected, obtaining contextual information related to the configuration and operation of the first cloud service, wherein the contextual information comprises information related to the second cloud service; providing the contextual information to a prediction model operable to identify a security posture from input contextual information; obtaining a recommended security posture from the prediction model, wherein the recommended security posture is based on the contextual information provided to the prediction model; and determining a security recommendation for the first cloud service based on a comparison of a current security posture of the first cloud service and the recommended security posture.

Optionally, the recommendation unit is separate from the cloud computing network. Optionally, the recommendation unit is configured to communicate with the first cloud service by an application programming interface.

BRIEF DESCRIPTION OF THE DRAWINGS

The foregoing and other objects, features, and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
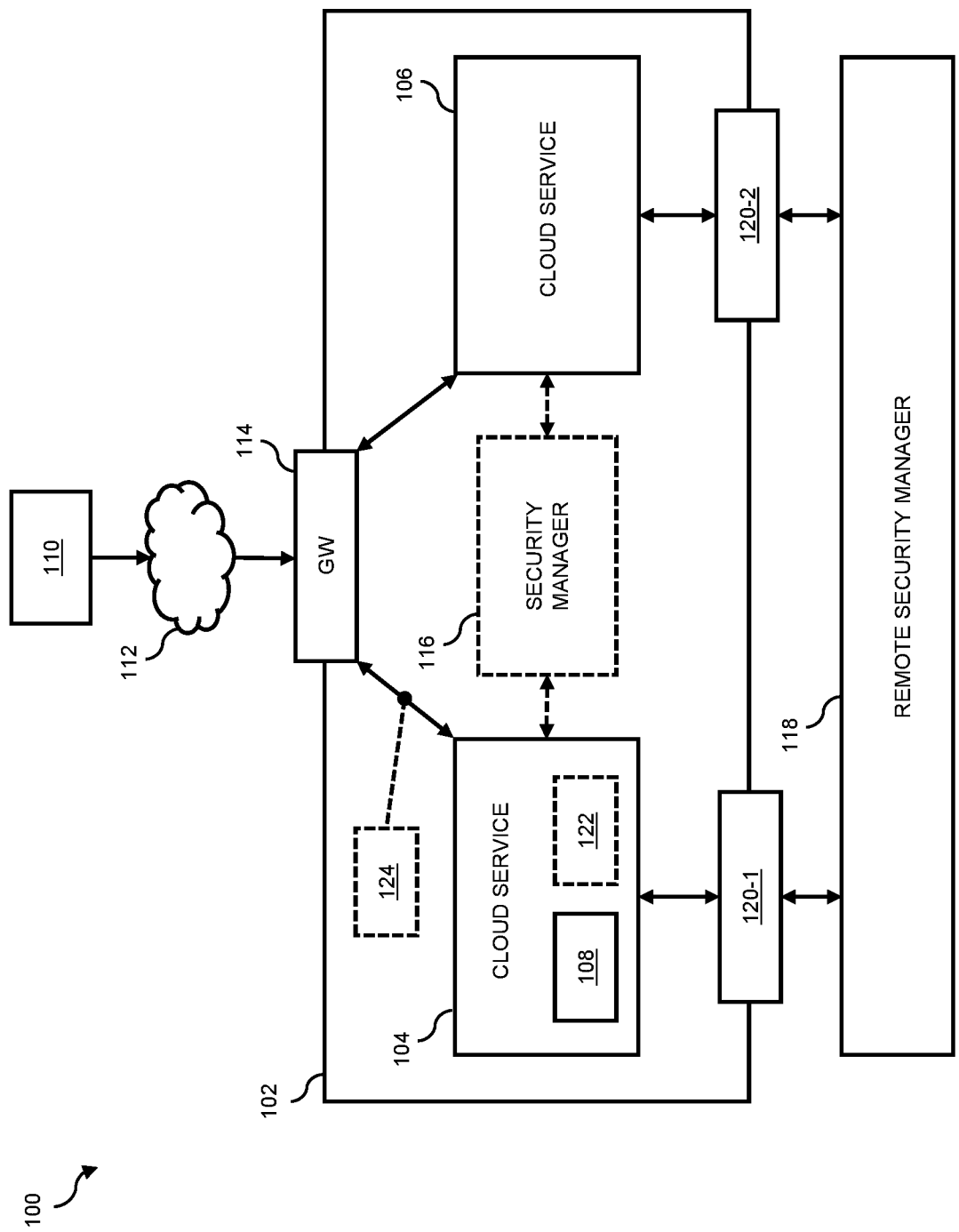
FIG. 1 illustrates a block diagram of an example cloud infrastructure environment.

Embodiments will now be described with reference to the accompanying figures. The foregoing may, however, be embodied in many different forms and should not be construed as limited to the illustrated embodiments set forth herein. It is to be noted that the following description is merely used for enabling the skilled person to understand the present disclosure, without any intention to limit the applicability of the present disclosure to other embodiments which could be readily understood and/or envisaged by the reader. Whilst the present disclosure is primarily directed to the automatic configuration of security settings within a cloud environment, the skilled person will readily appreciate that the systems, methods, and devices of the present disclosure are applicable to other areas of cybersecurity and could be employed to determine recommended security configurations for private enterprise networks and the like.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

FIG. 1 illustrates a block diagram of an example cloud infrastructure environment 100.

Generally, FIG. 1 shows a cloud platform 102 which hosts a first cloud service 104 and a second cloud service 106. The first cloud service 104 is running an operating system 108. An endpoint 110 communicates with the cloud platform 102 via an internetwork 112 and a gateway 114. FIG. 1 further shows a security manager 116 forming part of the cloud platform 102 and a remote security manager 118 which communicates with the cloud platform 102 via a first adaptor 120-1 and/or a second adaptor 120-2. Additionally, FIG. 1 shows a first agent 122 deployed within the first cloud service 104 and a second agent 124 deployed within the cloud platform 102.

The cloud platform 102 is associated with a cloud service provider. For example, the cloud platform could correspond to a virtual private cloud provided by Amazon Web Services, Google Cloud, Microsoft Azure, or the like. The cloud platform 102 will typically be associated with an organization or enterprise and may be used by the organization or enterprise to provide a number of cloud workloads. The cloud platform 102 may generally be understood as a cloud computing network.

In the example shown in FIG. 1, the first cloud service 104 and the second cloud service 106 are deployed on the cloud platform 102. A cloud service may refer to any type of cloud functionality offered on the cloud platform 102 by the cloud service provider. Examples of cloud services include an EC2 instance, container service, S3 bucket, Lambda, or the like. Alternatively, a cloud service may be a server, such as a web server or a database server. A cloud service may also be some other cloud functionality such as a Docker instance. As such, each cloud service may be associated with a cloud workload—that is, one or more applications or services which execute as part of the cloud service. In the example shown in FIG. 1, the first cloud service 104 is running the operating system 108 which may in turn be running one or more applications. For example, the first cloud service could be a Linux virtual machine such that the operating system is a Linux distribution, such as Debian or Ubuntu, which in turn runs an application such as a web server (e.g. Nginx, Apache, etc.). Although the example of FIG. 1 shows the first cloud service 104 running the operating system 108, a cloud service is not limited to being a virtual machine capable of running an operating system. In an alternative example, the first cloud service could be a cloud storage service such as an S3 bucket.

The endpoint 110 communicates with the cloud platform 102 via an internetwork 112, such as the Internet. The endpoint 110 may be any remote computing device that communicates with the cloud platform 102. Examples of endpoints include personal computing devices, mobile devices, remote servers, and the like. The cloud platform 102 provides a gateway 114 to allow external connections to the cloud services. The cloud platform 102 may utilize a router to route any incoming and outgoing connections to the relevant cloud service, e.g., the first cloud service 104 or the second cloud service 106.

In some examples, a security manager 116 is deployed within the cloud platform 102 to monitor and manage the security configurations of the cloud services deployed on the cloud platform 102. The security manager 116 thus has sufficient privileges to monitor and configure the cloud services deployed on the cloud platform 102. For example, the security manager 116 may have sufficient privileges to change the ports via which connections can be made to the first cloud service 104 and/or the second cloud service 106. Additionally, the security manager 116 may have the necessary privileges to observe all incoming and outgoing traffic to and from the cloud services. This may include identifying the source and target destinations (for example, IP addresses) of any packets sent to or from the first cloud service 104 and/or the second cloud service 106. The security manager 116 may also have the necessary privileges to enforce security measures and modify the settings and operation of the cloud services. For example, the security manager 116 may add security provisions to a cloud service such as adding a firewall or the like and may also manage security group settings for the cloud services.

Additionally or alternatively, a remote security manager 118 may be used to manage the security configuration of the cloud services deployed on the cloud platform 102. The remote security manager 118 communicates with the cloud services via one or more adapters provided by the cloud platform. For example, the remote security manager 118 communicates with the first cloud service 104 via the first adapter 120-1 and communicates with the second cloud service 106 via the second adapter 120-2. In one example, the first adapter 120-1 and/or second adapter 120-2 correspond to an application programming interface (API). As is known, an API is an interface which facilitates a connection between two computing devices or computer programs.

Within the context of the cloud platform 102, the API exposes a number of functions and/or services of the cloud platform 102 such that the remote security manager 118 has access to these functions and/or services. The connections provided by the first adaptor 112-1 and the second adaptor 112-2 are such that the remote security manager 118 has sufficient privileges to monitor and configure the cloud services deployed on the cloud platform. In one embodiment, the remote security manager 118 monitors and configures the cloud services on the cloud platform via the security manager 116 such that the remote security manager 118 remotely operates the security manager 116.

As will be described in more detail below, the security manager 116 and/or the remote security manager 118 may include a recommendation unit which is operable to determine a security recommendation from information obtained from the cloud services and the cloud platform. In one embodiment, the recommendation unit is a separate hardware unit implemented within the security manager and/or remote security manager. In an alternative embodiment, the recommendation unit is implemented as a software module of the security manager and/or remote security manager.

Information related to the first cloud service 104, the second cloud service 106, and/or the cloud platform 102 is obtained from one or more agents deployed within the first cloud service 104, the second cloud service 106, and/or the cloud platform 102. In the example shown in FIG. 1, a first agent 122 is deployed within the first cloud service 104 and a second agent 124 is deployed within the cloud computing network, i.e., within the cloud platform 102. The first agent 122 is operable to obtain, record, and/or transmit information related to the operation of the first cloud service 104. For example, the first agent 122 may collect information related to the operating system 108 such as the version of the operating system, the security state, and whether the operating system is patched. Once this data has been collected, it is sent to the security manager 116 and/or the remote security manager 118 for further analysis. The second agent 124 is operable to obtain, record, and/or transmit information related to the network traffic behavior of the first cloud service 104. For example, the second agent 124 can monitor the inbound and outbound network traffic to and from the first cloud service 104, as well as information related to the ports and protocols used, to determine the network traffic behavior of the first cloud service 104. As with the first agent 122, once this data has been collected by the second agent 124, it is sent to the security manager 116 and/or the remote security manager 118 for further analysis. Whilst only two agents are illustrated in FIG. 1, multiple agents can be deployed to capture a variety of contextual information, as will be described in more detail below.

Due to the inherent complexity of cloud computing environments and cloud services—such as the cloud platform 102, the first cloud service 104, and the second cloud service 106—it is often difficult for an administrator to determine the appropriate security protection to apply for a given cloud service. Even if such protection is determined, it can be time consuming for the administrator to maintain an adequate level of protection manually due to the dynamic nature of the cloud environment. In addition, determining appropriate security protection for a cloud service typically requires security expertise that many administrators may not possess. Nevertheless, it is important for the configuration and operation of cloud services to be appropriately secured to protect them from malicious attacks. Moreover, automatically determining appropriate security protection for a cloud service can help provide an increase in inefficiency and can lead to novel security solutions being proposed which may otherwise not have been identified by a human administrator.

Figure 2A:
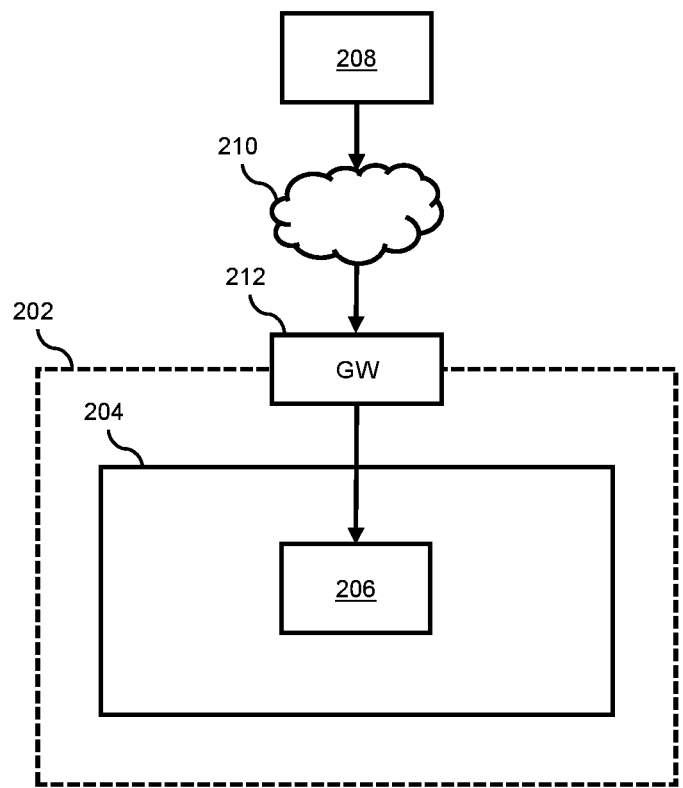
FIGS. 2A and 2B illustrate a first example of securing a cloud service by modifying the configuration and operation of the cloud service.
Figure 2B:
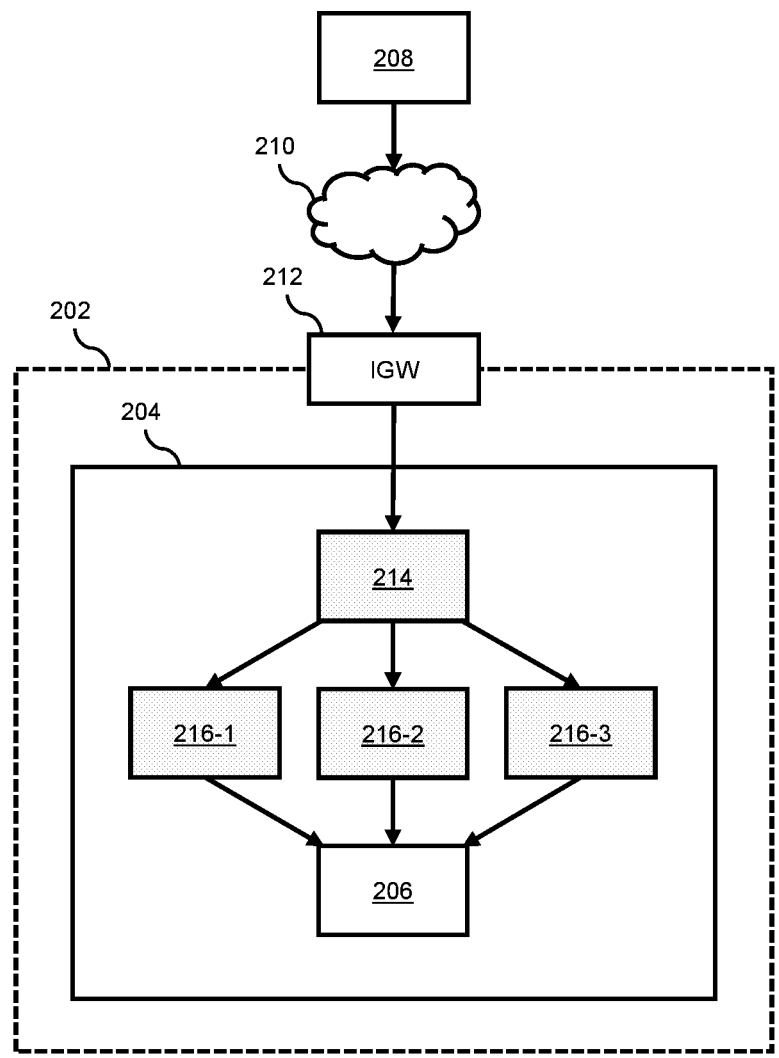

FIGS. 2A and 2B illustrate a first example of securing a cloud service by modifying the configuration and operation of the cloud service.

FIG. 2A shows a cloud platform 202 which hosts a cloud service 204 running a web server 206. A user device 208 connects to the web server 206 via the Internet 210 and the gateway 212. As such, the cloud platform 202 and the cloud service 204 are similar to the cloud platform 102 and the first cloud service 104 illustrated in FIG. 1. In the example shown in FIG. 2, the cloud service 204 corresponds to a Linux virtual machine running an Apache web server 206.

Contextual information related to the cloud service 204 can be collected to determine the security status of the cloud service. For example, by monitoring the network behavior of connections to the cloud service 204 it can be determined that all HTTP traffic is allowed to the web server 206 such that traffic from known malicious IP addresses are being passed through to the web server. Moreover, by analyzing workload information related to the web server 206 it can be determined that the web server 206 is running an outdated version of the Apache software.

The contextual information obtained from the cloud service 204 shown in FIG. 2A thus reveals several security vulnerabilities. The cloud service 204 does not monitor or control any of the incoming or outgoing traffic to the Apache web server 206. The Apache web server 206 is thus not protected from malicious attacks such as cross-site scripting (XSS), SQL injections, and the like. Moreover, the Apache web server 206 is running an outdated release of the Apache software which may present further software and security vulnerabilities. Thus, the overall security posture of the example cloud service 204 illustrated in FIG. 2A is weak.

In general, a security posture may be understood as the security capabilities of an organization or enterprise. As such, the security posture of an enterprise encompasses the security status of the enterprise's networks, information, and systems at a given point in time. Within the context of the present disclosure, a security posture refers to the status and configuration of a cloud computing environment's security, particularly the security status and configuration of a cloud service, such as the cloud service 204 shown in FIG. 2A. As such, the security posture of a cloud service may alternatively be referred to as the security configuration, the security settings, the security status, or the security state of the cloud service. The security posture of a cloud service may thus be understood as the security settings, configurations, and/or statuses of the cloud service. The security posture of a cloud service can therefore be improved by adapting and improving the security settings, configurations, and/or statuses of the cloud service.

FIG. 2B shows a recommended security posture for the cloud computing environment shown in FIG. 2A. FIG. 2B shows the cloud platform 202, the cloud service 204, the web server 206, the user device 208, the Internet 210, and the gateway 212 as shown in FIG. 2A.

FIG. 2B further shows an elastic load balancer 214 and a plurality of scalable web application firewalls 216-1, 216-2, and 216-3. In FIG. 2B, the recommended security posture, or recommended security configuration, comprises protecting the web server 206 by an auto scaling stack. Specifically the elastic load balancer 214 is employed to scale a plurality of scalable web application firewalls 216-1, 216-2, and 216-3 as required. By utilizing a web application firewall (WAF), also known as a reverse proxy, the web server 206 is protected from attacks such as XSS, SQL injections, and the like. Moreover, the recommended security posture comprises upgrading the web server 206 to the latest stable release of the Apache software. Applying security recommendations based on the recommended security posture thus helps secure the cloud service 204 and the web server 206.

Figure 2C:
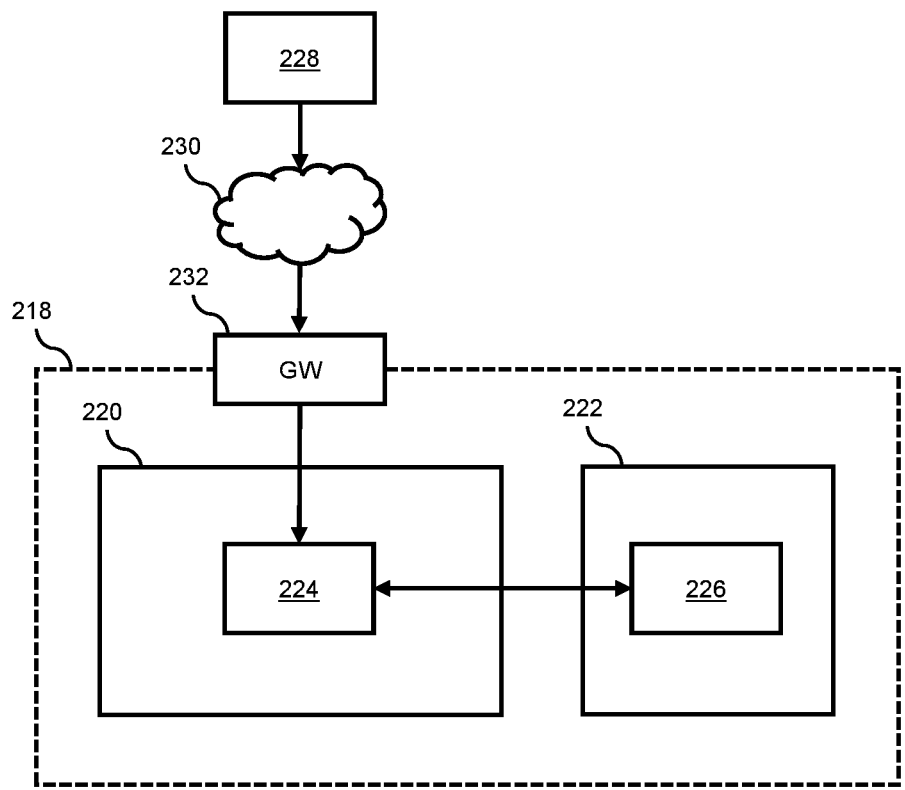
FIG. 2C illustrates a second example of securing a cloud service by modifying the configuration and operation of the cloud service.

FIG. 2C shows a second example of securing a cloud service by modifying the configuration and operation of the cloud service.

FIG. 2C shows a cloud platform 218 which hosts a first cloud service 220 and a second cloud service 222. The first cloud service 220 runs a web server 224 and the second cloud service 222 runs a data repository service 226 (e.g., a database, data store, or the like). A user device 228 connects to the web server 224 via the Internet 230 and the gateway 232. The web server 224 of the first cloud service 220 is communicatively linked via a network connection to the data repository service 226 of the second cloud service 222. As such, the cloud platform 218, the first cloud service 220, and the second cloud service 222 are similar to the cloud platform 102, the first cloud service 104, and the second cloud service 106 illustrated in FIG. 1.

Contextual information related to the first cloud service 220 is collected to determine the security status of the first cloud service 220. The contextual information comprises information such as network traffic information related to network traffic activity of the first cloud service 220 or health state information. In both instances, the contextual information comprises information directly related to the first cloud service 220 and indirectly related to the second cloud service 222. For example, the network traffic activity contextual information comprises network activity between the first cloud service 220 and the second cloud service 222 thus providing indirect contextual information regarding activity at the second cloud service 222 (based on data packets received from the second cloud service 222 at the first cloud service 220). As a further example, the contextual information comprises health state information related to heartbeat response indicators associated with the second cloud service 222.

In the example shown in FIG. 2C, the contextual information may be utilized to identify a vulnerability in relation to the first cloud service 220. For instance, upon the second cloud service 222 being deployed within the cloud platform 218, the first cloud service 220 may obtain health state information from the second cloud service 222 in the form of one or more heartbeat response indicators. Based on this contextual information, the first cloud service 220 may determine that the second cloud service 222 has been compromised in some way. Thus, the contextual information may indicate that the first cloud service 220 has a vulnerable security posture by virtue of the communication with the second cloud service 222. To help reduce the risk that the second cloud service 222 poses, the security posture (security configuration) of the first cloud service 220 may be changed (e.g., by terminating or blocking network traffic to/from the second cloud service 222).

According to an aspect of the present disclosure, there are provided systems and methods for automatically determining the recommended security configuration of a cloud service, such as the security configuration shown in FIG. 2B. Generally, data from a variety of contextual information sources (e.g. security group settings, traffic analysis, installed applications, running services, and the like) related to a given cloud service are provided to a prediction model which determines a recommended security posture for the given cloud service. The recommended security posture is used to identify a security recommendation which can be used to update the security configuration of the cloud service automatically.

Figure 3A:
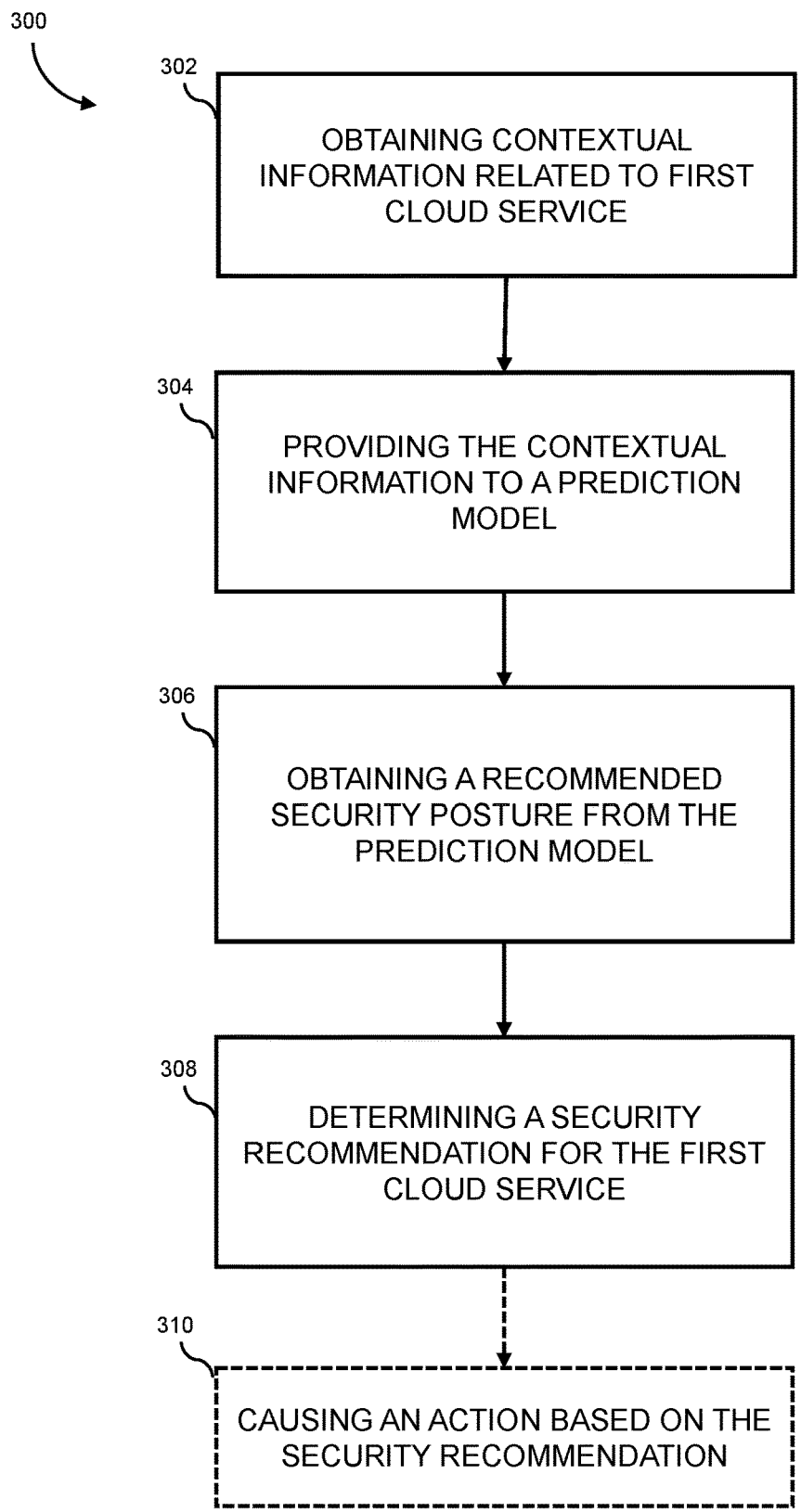
FIG. 3A shows a method for automatically determining the recommended security configuration of a cloud service according to an embodiment of the present disclosure.

FIG. 3A shows a method 300 for automatically determining the recommended security configuration of a cloud service according to an aspect of the present disclosure.

In one embodiment, the method 300 is performed by an application running as part of a cloud infrastructure. For example, the method 300 can be executed as part of operations performed by a cloud platform security manager, such as the security manager 116 shown in FIG. 1. In an alternative embodiment, the method 300 is performed by an application running externally to the cloud infrastructure. For example, the method 300 can be executed as part of operations performed by a remote security manager, such as the remote security manager 118 shown in FIG. 1. In such an example, the remote security manager can communicate with the cloud platform, and thus the cloud services, by means of one or more application programming interfaces (APIs). As described above, in the example shown in FIG. 1 the remote security manager 118 communicates with the cloud platform 102 by the first adaptor 120-1 and the second adaptor 120-2 which can be APIs for communicating with the first cloud service 104 and the second cloud service 106 respectively.

As shown in step 302, the method 300 may include obtaining contextual information related to the configuration and operation of a first cloud service deployed within a cloud computing network.

As stated briefly above in relation to FIG. 2A, contextual information may be used to identify the security status of various aspects of the first cloud service. For example, the contextual information can identify the presence of malicious traffic passing to or from the first cloud service. As a further example, the contextual information can indicate the configuration of the first cloud service in terms of the ports and protocols that are open and allowed by the first cloud service. As an additional example, the contextual information can record the operation of the first cloud service in terms of resource usage such as processor and memory utilization. Obtaining contextual information from a variety of sources therefore allows the overall security state of the first cloud service to be modelled.

As is clear from the above, contextual information may be obtained from a variety of different sources within the first cloud service. At a general level, the contextual information captures information related to the target service provided by the first cloud service. For example, the contextual information can indicate that the first cloud server corresponds to an AWS EC2 instance, docker instance, or the like. As will be described in more detail below, the contextual information may also capture information that is indicative of the current state, both in terms of security and operation, of the first cloud service. This information may then be utilized to determine an appropriate security posture for the first cloud service and thereby identify recommendations to help improve the security status of the first cloud service.

The contextual information additionally or alternatively includes security configuration information related to the first cloud service. Security configuration information comprises a variety of different settings and statuses related to the general security configuration of the first cloud service. For example, security configuration information can include information related to the current security protection for the first cloud service such as whether a firewall is in place and what traffic the firewall is configured to block.

The security configuration information additionally or alternatively includes information relating to security groups and settings for the first cloud service. Within certain cloud computing offerings, such as Amazon Web Services (AWS), security groups are used to provide one or more rules to dictate what traffic (e.g., in terms of protocols and port numbers) may be allowed to pass to a given cloud service.

The contextual information additionally or alternatively includes network traffic information related to network activity of the first cloud service. The network traffic information includes network activity behavior data related to the first cloud service. For example, the network traffic information can include a list of network connections initiated and/or received as well as information related to the traffic in and/or out of the first cloud service. The information can be collected over a predetermined period of time and provided in summary form. For example, the network traffic information can provide a summary of the number of network connections initiated by the first cloud service over a 24-hour period. The network traffic information can also include information related to the configuration of the network traffic observed such as the ports and protocols used as well as the source and/or destination of the communication.

The network traffic information can be captured by a network monitor, by the cloud infrastructure (e.g., by the cloud service provider or an application/service running thereon), by an agent running within the cloud infrastructure (e.g., by the second agent 124 as shown in FIG. 1), or by a firewall or gateway.

The contextual information additionally or alternatively includes health state information related to the first cloud service. Health state information includes information related to the general security health of the first cloud service. For example, the health state information can be indicative of whether the first cloud service is compromised (i.e. the first cloud service has been affected by an intrusion such as malware) or is otherwise healthy. Health state information also captures statistics and information related to the performance and usage of the first cloud service. For example, the health state information can include load and performance metrics, usage statistics and spikes, and/or filesystem or workload changes. Health state information also includes information related to the current update status of one or more applications or services on the first cloud service. For example, the health state information can indicate whether or not updates are needed for an operating system and/or application associated with the first cloud service. As will be described in more detail below, in some examples the health state information is obtained from an agent deployed within the first cloud service and configured to report the health state of the first cloud service periodically to a security manager (e.g., in the form of a heartbeat).

The contextual information additionally or alternatively includes configuration information related to a current configuration of the first cloud service. For example, the configuration information can include information related to what base image was used to create the first cloud service. In the present context, the base image refers to the software-including the operating system, applications, configurations, and data—that the first cloud service runs when first instantiated. The configuration information may also include other general configuration information related to a specific configuration of the first cloud service such as what ports are open on the cloud service.

The contextual information additionally or alternatively includes workload information related to an application or a service associated with the first cloud service. The workload information relates to identified components associated with the first cloud service. For example, the workload information can include information related to the operating system of the first cloud service (e.g., Microsoft Server 2016 MR2), or specific software running on the first cloud service (e.g., Microsoft Exchange Server or Nginx web server). The workload information also relates to types or classifications of workloads associated with the first cloud service. That is, the workload information provides a high-level description of the type of workload performed by the first cloud service. For example, a cloud service running a Linux virtual machine and an Apache web server can be classified as a "web server", whilst a Microsoft Server virtual machine running Microsoft Exchange Server can be classified as a "mail server".

The contextual information additionally or alternatively includes deployment template information associated with the first cloud service. In the present context, deployment template information refers to a general resource that is used to define the properties of the first cloud service (e.g., the machine type, boot disk image, etc.). Additionally or alternatively, the contextual information includes the configuration values used for the deployment template of the first cloud service.

In embodiments, the cloud computing network comprises a second cloud service and the contextual information comprises information related to the configuration and operation of the second cloud service. In such embodiments, any combination of the above-mentioned configuration information can be captured in relation to the second cloud service.

In an embodiment, the contextual information is obtained from an agent, or a plurality of agents, deployed within the cloud computing network. In the example shown in FIG. 1, the contextual information is obtained at least in part from the first agent 122 and/or the second agent 124. In the example shown, the first agent 122 obtains contextual information related to the first cloud service 104 such as health state, security configuration, deployment template information, and the like, whilst the second agent 124 obtains network traffic information related to the first cloud service 104. Both the first agent 122 and the second agent 124 report the contextual information back to a security manager such as the security manager 116 or the remote security manager 118. In one embodiment, the agents periodically report new contextual information to the relevant security manager. Alternatively, the agents report new contextual information not the relevant security manager when requested to do so by the relevant security manager.

Accordingly, the method 300 in one embodiment further includes the step of deploying an agent within the first cloud service. Deploying an agent within a cloud service comprises installing an agent on the cloud service with sufficient privileges to access and monitor cloud administration information. The agent is then configured to send contextual information updates periodically or upon request to a security manager such that the security manager may record the contextual information related to the first cloud service. Alternatively, deploying an agent comprises deploying the agent in front of a cloud service to monitor network traffic to and from the cloud service. In a further alternative, deploying an agent may comprise deploying an agent within the cloud computing network to monitor the cloud services within the cloud computing network. As such, more than one agent may be used to monitor and access different contextual information related to a cloud service.

In one embodiment, the agent is deployed within the first cloud service based at least in part on contextual information obtained from a cloud management service associated with the first cloud service. For example, a cloud management service associated with the cloud computing network (e.g. a management service associated with the cloud platform 102 shown in FIG. 1) may provide to a security manager, such as security manager 116 or remote security manager 118, specific contextual information related to a cloud service to be monitored. The specific contextual information may indicate that the cloud service has been deployed using a base Microsoft Windows image. As such, based on this specific contextual information a suitable Microsoft Windows agent may be deployed on the cloud service.

After contextual information has been obtained from one or more of the different sources mentioned above, the obtained contextual information may be indicative of the current security posture of the first cloud service. That is, the obtained contextual may be indicative of the configuration and operation of the first cloud service and the security status thereof. The obtained contextual information may then be utilized to obtain a predicted improved security posture from a prediction model.

As shown in step 304, the method 300 may include providing the contextual information to a prediction model. The prediction model may be operable to identify a security posture from input contextual information.

The skilled person will appreciate that the contextual information may be provided to the prediction model in a number of ways. In one embodiment, the contextual information is in vectorized form. For example, the contextual information may comprise a vector having values corresponding to the different security status values described above, with values from different information sources being concatenated to form the vector. The values from the different information sources may be integer valued, real valued, or one-hot encoded values. For example, the values corresponding to network traffic information may comprise a vector of real values corresponding to the number of initiated connections, the number of received connections, the number of active ports, the amount of data received in the previous 24 hours and the like. As a further example, the values corresponding to configuration information may be one-hot encoded with each value corresponding to a binary flag indicating the presence or absence of a particular configuration (e.g., a vector [1, 0, 0] may indicate a Microsoft Server 2016 base image was used whilst a vector [0, 1, 0] may indicate that a Microsoft Server 2016 MR2 base image was used). To allow the prediction model to be used for different combinations of contextual information, the input vector provided to the prediction model may correspond to the concatenated output of all possible information sources described above. As such, in an embodiment, the contextual information provided to the prediction model is sparse since not all information sources may be employed.

The prediction model may comprise a machine learning model trained using training data. The machine learning model comprises a classification model such as an XGBoost model, a random forest model, a k-nearest neighbor model, or a neural network such as a multilayer perceptron. The input to the machine learning model is a vector $x \in \mathbb{R}^p$ corresponding to the concatenated output of the above described contextual information sources. The output of the machine learning model is a vector $y \in \{0, 1\}^q$ corresponding to the recommended security posture. As such, the machine learning model may include a multi-class classifier. The output may be a binary vector having elements corresponding to a specific security setting or provision in the recommended security posture. For example, the first value may indicate whether a firewall should be used, the second value may indicate whether a specific port (e.g., port 80) should be used, a third value may indicate that secure hypertext transfer protocol should be used, a fourth value may indicate that communication with a specific cloud service (e.g., the second cloud service) should be blocked, and the like. As a further example, a value within the output binary vector may indicate that a security manager (e.g., the security manager 116 shown in FIG. 1) within the cloud computing network should take action in relation to another cloud service within the cloud computing network (e.g., isolate or quarantine the second cloud service).

In an embodiment, the training data comprises contextual information and associated security postures extracted from a plurality of cloud services. Such training data is obtained by extracting relevant contextual information and associated security posture from a number of real-world cloud service deployments. For example, a number of cloud service deployments can be examined and the contextual information as described above can be extracted. For each deployment, the security posture may be recorded. The security posture may correspond to the settings and configuration of the cloud service. This information is optionally supplemented by expert opinion. That is, a security professional may examine the security posture of a cloud service and provide additional improvements to the security posture such that the training data includes the additional improvements provided by the expert.

The skilled person will appreciate that the prediction model may be trained using the training data using any suitable training methodology. For example, an XGBoost model may be trained on the training data with the hyperparameters for the model being found using a grid search approach.

As shown in step 306, the method 300 may include obtaining a recommended security posture from the prediction model, where the recommended security posture is based on the contextual information related to the first cloud service provided to the prediction model. As stated above, the recommended security posture may correspond to a binary vector indicating which security settings or configurations should be turned on or off. Advantageously, the prediction model allows for latent issues to be identified by identifying patterns or relationships within the contextual information that would not otherwise be identifiable. As such, the contextual information and the prediction model may help to improve the overall security of the cloud computing network by identifying/predicting potential threats thereby allowing preventative and proactive action to be taken (cf. a purely reactive approach whereby action to mitigate or remediate threats are only taken after the threat has taken hold within the system).

As shown in step 308, the method may include determining a security recommendation for the first cloud service based on a comparison of a current security posture of the first cloud service and the recommended security posture. In an embodiment, the current security posture and the recommended security posture are both binary vectors and a comparison between the two vectors identifies which security settings and configurations should be changed (e.g., activated or deactivated) for the cloud service.

As previously stated, a security posture for a cloud service may include the security status of the cloud service; that is, the security posture comprises the security settings and configurations for the cloud service. By comparing the current security posture of the first cloud service to the recommended security posture of the first cloud service (as determined from the prediction model), security recommendations can be identified by identifying the differences between the two postures. Referring to the example shown in FIGS. 2A and 2B, the difference in security posture relates to the inclusion of an auto scaling stack of web application firewalls 216-1, 216-2, 216-3 to protect the web server 206. In such an example, the security recommendation would comprise the inclusion of the elastic load balancer 214 and the stack of web application firewalls 216-2, 216-2, 216-3.

Whilst the example shown in FIG. 2B relates to altering the infrastructure of the cloud service by including a web application firewall, the security recommendation may also relate to the underlying security configurations and settings of the cloud service. For example, the current security posture of a cloud service may indicate that a web server has all ports and protocols open for connection whilst the recommended security posture may indicate that only ports 80 and 443 as well as the hypertext transfer protocol (HTTP) and the hypertext transfer protocol secure (HTTPS) are open for the web server. As such, the security recommendation would include limiting the ports for the web server to ports 80 and 443, and the protocols to HTTP/HTTPS. The security recommendation may also include changes to underlying security settings such as network access control lists (ACLs) or security groups.

In one embodiment, as shown in step 310, the method includes causing an action based on the security recommendation. Optionally, the action comprises initiating one or more security measures on the first cloud service based on the security recommendation such that causing an action based on the security recommendation results in the automatic implementation of the security recommendation on the first cloud service.

The one or more security measures may include applying one or more security rules to the first cloud service. Here, security rules may be understood as referring to any change to the underlying security settings and configuration of the first cloud service. For example, if the security recommendation indicates that the security group for the first cloud service be changed, then the security rule applied to the first cloud service would comprise changing the security group for the first cloud service to that in the security recommendation. Alternatively, the one or more security measures include applying a virtual firewall to the first cloud service.

Figure 4A:
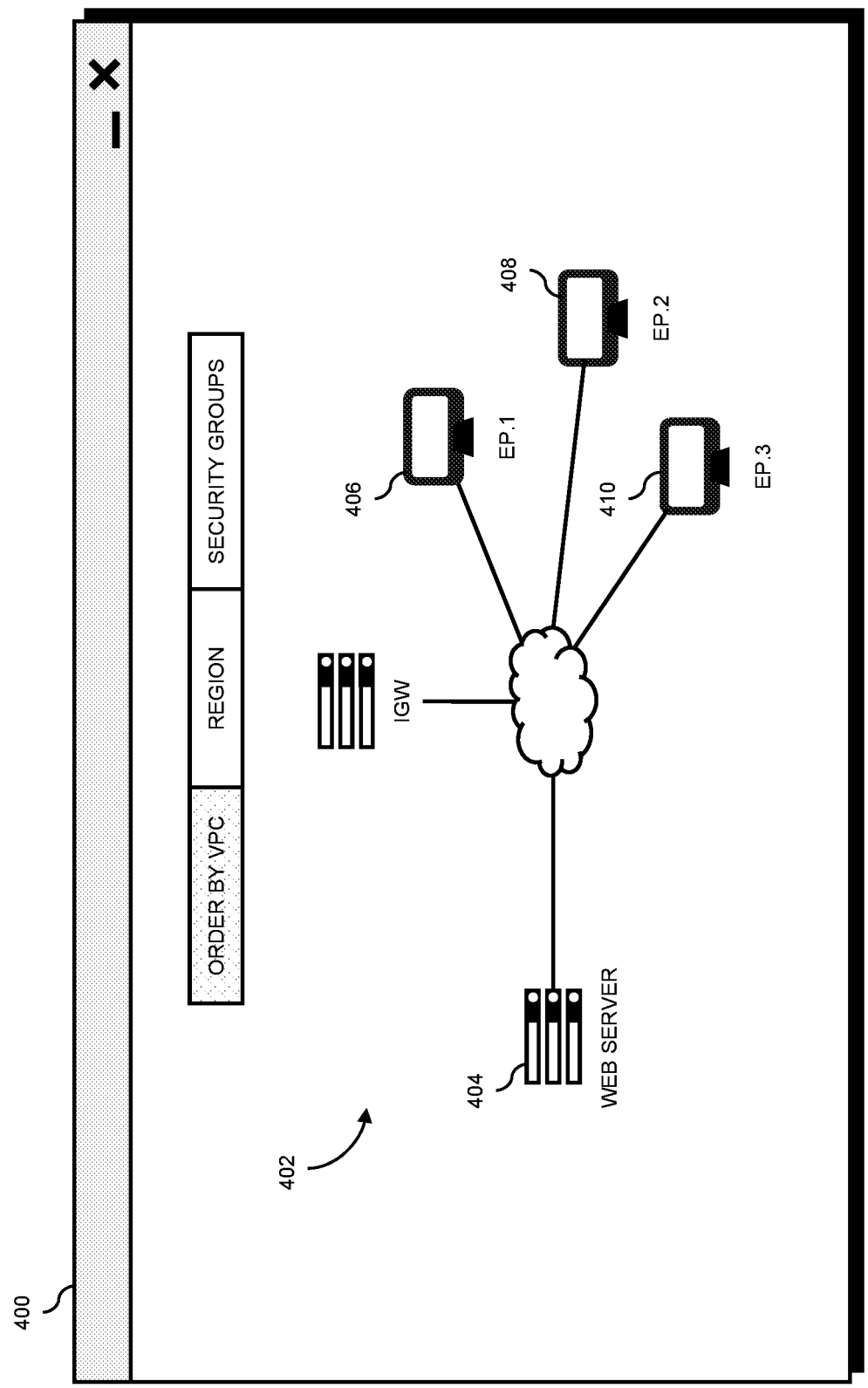
FIGS. 4A and 4B illustrate an application for displaying a graphical representation of a security recommendation.
Figure 4B:
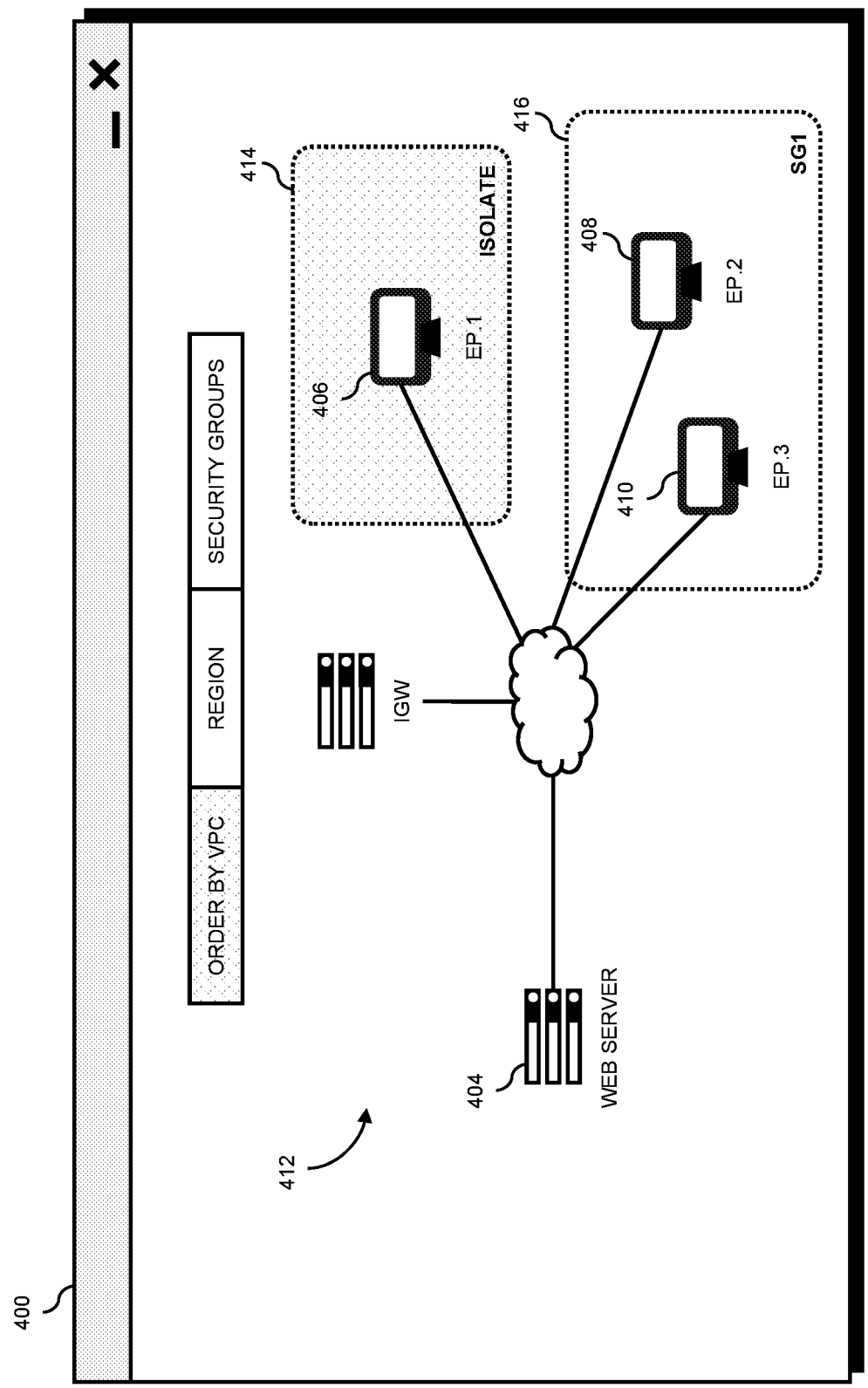

Additionally, or alternatively, the action comprises presenting an output based on the security recommendation. The output may then be utilized by an administrator of the cloud computing network to determine the changes to be made to the security of the first cloud service. The output may take the form of a list of security recommendations that could be made to the first cloud service. Alternatively, the output takes a graphical form as illustrated in FIGS. 4A and 4B.

According to a further aspect of the present disclosure, there are provided systems and methods for automatically determining the recommended security configuration of a first cloud service within a cloud computing network, such as the security configuration described in relation to FIG. 2C. In response to detecting a second cloud service being deployed within the cloud computing network, contextual information related to the configuration of the first cloud service is obtained. This contextual information also contains information related to the second cloud service (e.g., network activity between the two cloud services). A recommended security posture is then obtained from a prediction model based on the contextual information. The recommended security posture is then used to determine a security recommendation for the first cloud service. As such, the present disclosure is directed to an active threat management approach within a cloud computing network. By identifying and responding to potential threats early, the cloud computing network is able to take proactive action before a threat takes full effect.

Figure 3B:
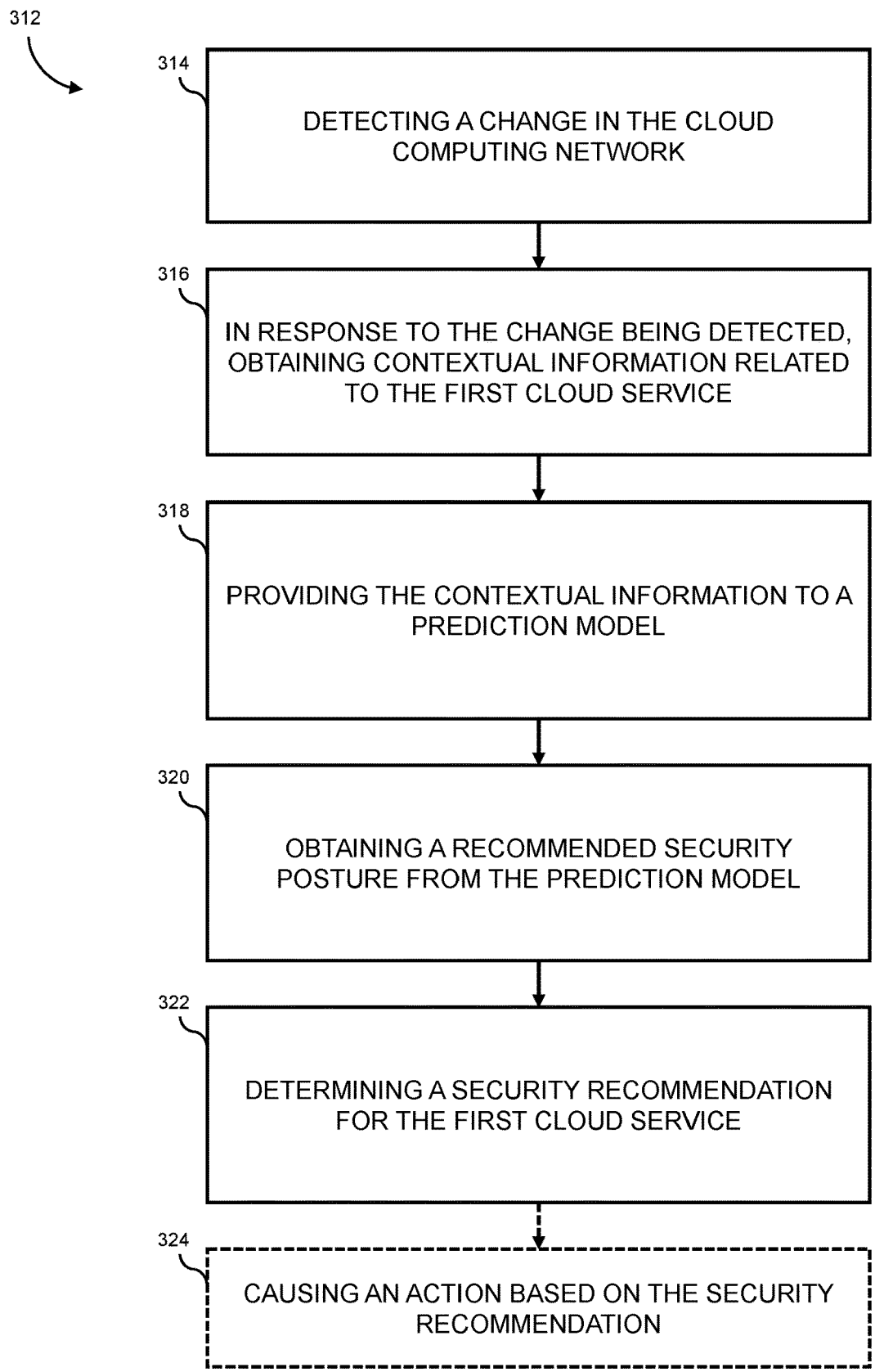
FIG. 3B shows a method for automatically determining the recommended security configuration of a first cloud service deployed within a cloud computing network according to an aspect of the present disclosure.

FIG. 3B shows a method 312 for automatically determining the recommended security configuration of a first cloud service deployed within a cloud computing network according to an aspect of the present disclosure. The skilled person will appreciate that there are many steps in common between the method 300 shown in FIG. 3A and the method 312 shown in FIG. 3B. As such, the description provided in relation to the steps of the method 300 is likewise to be considered as description applicable to the steps of the method 312 and vice versa. Therefore, in an embodiment the steps of the method 300 and the steps of the method 312 should be considered in conjunction.

In one embodiment, the method 312 is performed by an application running as part of a cloud infrastructure. For example, the method 312 can be executed as part of operations performed by a cloud platform security manager, such as the security manager 116 shown in FIG. 1. In an alternative embodiment, the method 312 is performed by an application running externally to the cloud infrastructure. For example, the method 312 can be executed as part of operations performed by a remote security manager, such as the remote security manager 118 shown in FIG. 1. In such an example, the remote security manager can communicate with the cloud platform, and thus the cloud services, by means of one or more application programming interfaces (APIs). As described above, in the example shown in FIG. 1 the remote security manager 118 communicates with the cloud platform 102 by the first adaptor 120-1 and the second adaptor 120-2 which can be APIs for communicating with the first cloud service 104 and the second cloud service 106 respectively.

As shown in step 314, the method 312 may include detecting a change in the cloud computing network, where the change relates to a second cloud service being deployed within the cloud computing network.

As shown in step 316, the method may include, in response to the change being detected, obtaining contextual information related to the configuration and operation of the first cloud service. The contextual information may include information related to the second cloud service.

The contextual information may comprise any of the contextual information described above in relation to method 300. Particularly, the contextual information may comprise network traffic information related to network activity of the first cloud service. The network traffic information may comprise information related to network activity between the first cloud service and the second cloud service. For example, the network traffic information may comprise a volume of traffic received by the first cloud service from the second cloud service (e.g., absolute or average traffic volume over a period of time such as 1 minute, 10 minutes, 30 minutes, 1 hour, 12 hours, etc.). As described in more detail above, the network traffic information can be captured by a network monitor, by the cloud infrastructure (i.e. by the cloud service provider or an application/service running thereon), by an agent running within the cloud infrastructure (e.g., by the second agent 124 as shown in FIG. 1), by a firewall or gateway, or any other known suitable means.

Additionally, or alternatively, the contextual information may comprise health state information related to heartbeat response indicators associated with the second cloud service. For example, the second cloud service may be configured to send messages (heartbeats) periodically to other cloud services in the cloud network. The receipt of such messages at the first cloud service may be used to determine a health state of the second cloud service. For instance, if such messages at received at the expected frequency, then this indicates that the second cloud service is in a non-compromised health state, whereas the cessation of such messages being received indicates that the second cloud service may be compromised. Other known techniques for determining a health state using heartbeat, or similar, messages may be used.

The contextual information may comprise a snapshot of the state of the security and configuration information described above at a time point approximate to when the change in the cloud computing network is detected (e.g., a time point after the second cloud service has been deployed). Alternatively, the contextual information may be obtained by collating, averaging, or otherwise combining contextual information recorded over a time period following the detection of a change in the cloud computing network (e.g., the average contextual information recorded in a 2 hour period after the second cloud service is deployed).

In an embodiment, the contextual information is obtained from an agent, or a plurality of agents, deployed within the cloud computing network (as described in detail above in relation to the method 300). Accordingly, the method 312 in one embodiment further includes the step of deploying an agent within the first cloud service. Deploying an agent within a cloud service comprises installing an agent on the cloud service with sufficient privileges to access and monitor cloud administration information. The agent is then configured to send contextual information updates periodically or upon request to a security manager such that the security manager may record the contextual information related to the first cloud service. Alternatively, deploying an agent comprises deploying the agent in front of a cloud service to monitor network traffic to and from the cloud service. In a further alternative, deploying an agent may comprise deploying an agent within the cloud computing network to monitor the cloud services within the cloud computing network. As such, more than one agents may be used to monitor and access different contextual information related to a cloud service.

In one embodiment, the agent is deployed within the first cloud service based at least in part on contextual information obtained from a cloud management service associated with the first cloud service. For example, a cloud management service associated with the cloud computing network (e.g., a management service associated with the cloud platform 102 shown in FIG. 1) may provide to a security manager, such as security manager 116 or remote security manager 118, specific contextual information related to a cloud service to be monitored. The specific contextual information may indicate that the cloud service has been deployed using a base Microsoft Windows image. As such, based on this specific contextual information a suitable Microsoft Windows agent may be deployed on the cloud service.

After contextual information has been obtained from one or more of the different sources mentioned above, the obtained contextual information is indicative of the current security posture of the first cloud service. That is, the obtained contextual is indicative of the configuration and operation of the first cloud service and the security status thereof, particularly in relation to potential vulnerabilities posed by the second cloud service. The obtained contextual information is then utilized to obtain a predicted improved security posture from a prediction model.

As shown in step 318, the method may include providing the contextual information to a prediction model operable to identify a security posture from input contextual information. The step 318 of providing may be the same as the step 304 of providing in the method 300 and we refer to the above description in relation to the method 300 for further details regarding the prediction model and the training thereof. Advantageously, the prediction model may allow for latent issues regarding the second cloud service to be identified by identifying patterns or relationships within the contextual information that would not otherwise be identifiable. By predicting potential threats posed by the second cloud service from the context of the first cloud service, potential threats in relation to the second cloud service may be identified even when the second cloud service has been compromised to an extent that no threat identification is performable by the second cloud service. As such, the contextual information and the prediction model help to improve the overall security of the cloud computing network by identifying/predicting potential threats thereby allowing preventative and proactive action to be taken (cf. a purely reactive approach whereby action to mitigate or remediate threats are only taken after the threat has taken hold within the system).

As shown in step 320, the method may include obtaining a recommended security posture from the prediction model, where the recommended security posture is based on the contextual information provided to the prediction model. As stated above, the recommended security posture may correspond to a binary vector indicating which security settings or configurations should be turned on or off within the first cloud service. The binary vector may comprise values indicative of restricting or blocking network activity to/from the second cloud service at the first cloud service. Additionally, or alternatively, the binary vector may comprise values indicative of an action that a security manager (e.g., the security manager 116 shown in FIG. 1) within the cloud computing network should take in relation to the second cloud service (e.g., isolate, quarantine, redeploy, etc.).

As shown in step 322, the method may include determining a security recommendation for the first cloud service based on a comparison of a current security posture of the first cloud service and the recommended security posture. In an embodiment, the current security posture and the recommended security posture are both binary vectors and a comparison between the two vectors identifies which security settings and configurations should be changed (e.g., activated or deactivated) for the cloud service.

By comparing the current security posture of the first cloud service to the recommended security posture of the first cloud service (as determined from the prediction model), security recommendations can be identified by identifying the differences between the two postures. Referring to the example shown in FIG. 2C, the difference in security posture, and thus the security recommendation, relates to the blocking of network traffic between the first cloud service 220 and the second cloud service 222.

As shown in step 324, in one embodiment, the method may include causing an action based on the security recommendation. The action may comprise blocking network traffic received from the second cloud service at the first cloud service. Additionally, or alternatively, the action may comprise isolating the second cloud service within the cloud computing network. Isolating the second cloud service comprises terminating communication between the first cloud service and the second cloud service. Alternatively, isolating the second cloud service comprises placing the second cloud service within a certain restricted security group. Additionally, or alternatively, the action may comprise redeploying the second cloud service. Because the second cloud service forms a part of the same cloud computing network (cloud platform) as the first cloud service, the second cloud service may be redeployed, or the security settings and operations of the second cloud service may be modified, as part of the security measures undertaken. For example, if the second cloud service was created using a template and has since been identified as having an unhealthy state, then the second cloud service may be redeployed using the same template, or a different template that is known to result in a healthy deployment could be used. Additionally, or alternatively, the action may comprise presenting an output based on the security recommendation. The output may then be utilized by an administrator of the cloud computing network to determine the changes to be made to the security of the first cloud service. The output takes the form of a list of security recommendations that could be made to the first cloud service and/or the second cloud service. Alternatively, the output takes a graphical form as illustrated in FIGS. 4A and 4B.

FIG. 4A shows an application 400 comprising a graphical representation 402 of a cloud computing network. The graphical representation 402 comprises a first representation 404 of a web server within the cloud computing network, a second representation 406 of a first endpoint, a third representation 408 of a second endpoint, and a fourth representation 410 of a third endpoint. As such, the graphical representation 402 shown within the application 400 provides a graphical snapshot of the configuration of the cloud computing network.

FIG. 4B shows the application 400 comprising an updated graphical representation 412 representing the security recommendation. As such, the output presented corresponds to the updated graphical representation 412. In the example shown in FIG. 4B, the security recommendation is to isolate the first endpoint, as shown by the first grouping of updated graphical representation 412 containing the first representation 404, and to place the second and third endpoints within security group one, as shown by the second group 414 containing the second representation 406 and the third representation 408. An administrator would be able to view the output (i.e. the updated graphical representation 412) and easily identify and act upon the suggested changes shown within the output.

Figure 5:
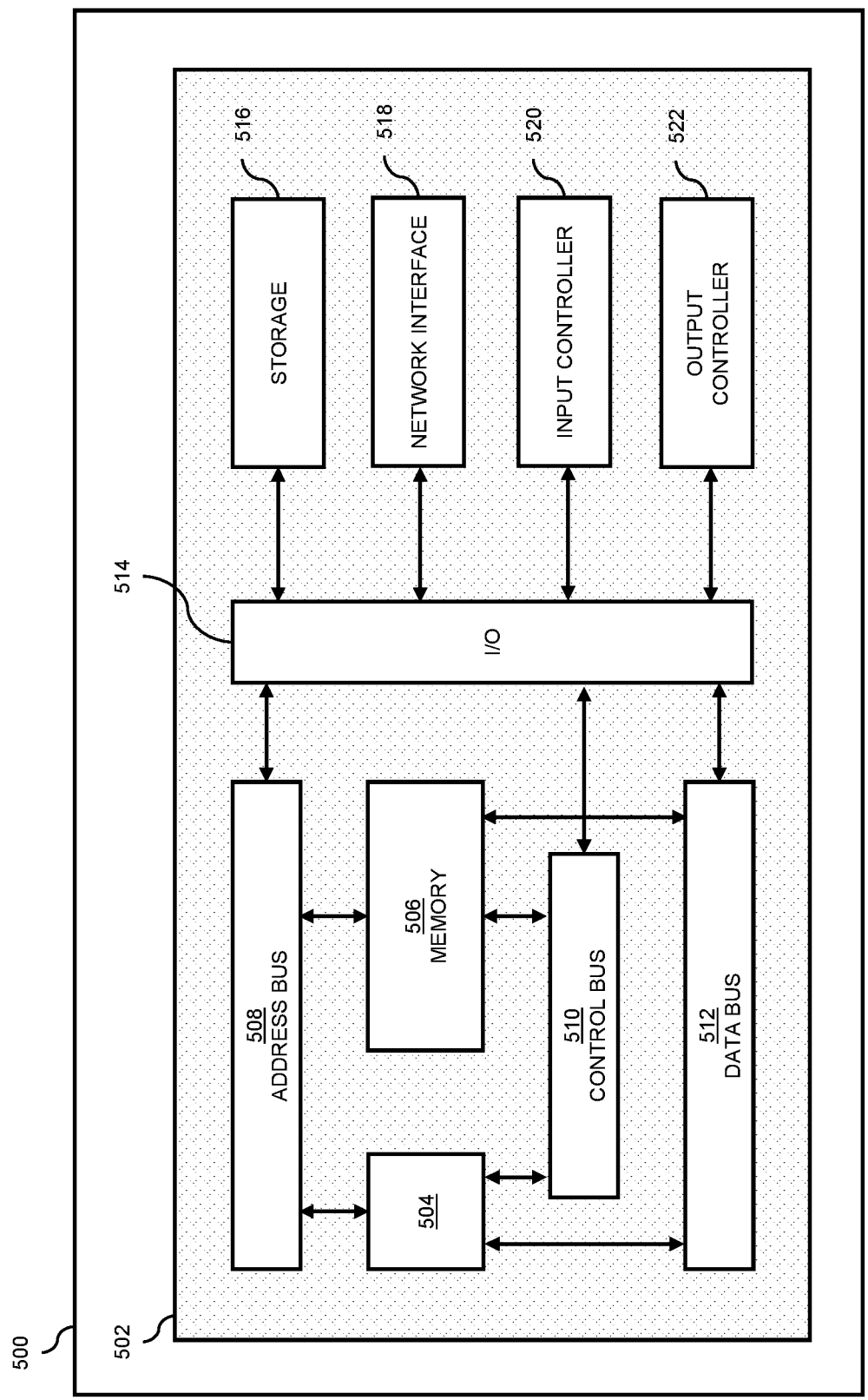
FIG. 5 shows an example computing system according to an aspect of the present disclosure.

FIG. 5 shows an example computing system for automatically determining the recommended security configuration of a cloud service. Specifically, FIG. 5 shows a block diagram of an embodiment of a computing system according to example aspects and embodiments of the present disclosure.

Computing system 500 can be configured to perform any of the operations disclosed herein such as, for example, any of the operations discussed with reference to the method described in relation to FIGS. 3A and 3B and/or the recommendation unit described in relation to FIG. 1. Computing system includes one or more computing device(s) 502. Computing device(s) 502 of computing system 500 comprise one or more processors 504 and memory 506. One or more processors 504 can be any general-purpose processor(s) configured to execute a set of instructions. For example, one or more processors 504 can be one or more general-purpose processors, one or more field programmable gate array (FPGA), and/or one or more application specific integrated circuits (ASIC). In one embodiment, one or more processors 504 include one processor. Alternatively, one or more processors 504 include a plurality of processors that are operatively connected. One or more processors 504 are communicatively coupled to memory 506 via address bus 508, control bus 510, and data bus 512. Memory 506 can be a random-access memory (RAM), a read-only memory (ROM), a persistent storage device such as a hard drive, an erasable programmable read-only memory (EPROM), and/or the like. Computing device(s) 502 further comprise I/O interface 514 communicatively coupled to address bus 508, control bus 510, and data bus 512.

Memory 506 can store information that can be accessed by one or more processors 504. For instance, memory 506 (e.g. one or more non-transitory computer-readable storage mediums, memory devices) can include computer-readable instructions (not shown) that can be executed by one or more processors 504. The computer-readable instructions can be software written in any suitable programming language or can be implemented in hardware. Additionally, or alternatively, the computer-readable instructions can be executed in logically and/or virtually separate threads on one or more processors 504. For example, memory 506 can store instructions (not shown) that when executed by one or more processors 504 cause one or more processors 504 to perform operations such as any of the operations and functions for which computing system 500 is configured, as described herein. In addition, or alternatively, memory 506 can store data (not shown) that can be obtained, received, accessed, written, manipulated, created, and/or stored. In some implementations, computing device(s) 502 can obtain from and/or store data in one or more memory device(s) that are remote from the computing system 500.

Computing system 500 further comprises storage unit 516, network interface 518, input controller 520, and output controller 522. Storage unit 516, network interface 518, input controller 520, and output controller 522 are communicatively coupled via I/O interface 515.

Storage unit 516 is a computer readable medium, preferably a non-transitory computer readable medium, comprising one or more programs, the one or more programs comprising instructions which when executed by one or more processors 504 cause computing system 500 to perform the method steps of the present disclosure. Alternatively, storage unit 516 is a transitory computer readable medium. Storage unit 516 can be a persistent storage device such as a hard drive, a cloud storage device, or any other appropriate storage device.

Network interface 518 can be a Wi-Fi module, a network interface card, a Bluetooth module, and/or any other suitable wired or wireless communication device. In an embodiment, network interface 518 is configured to connect to a network such as a local area network (LAN), or a wide area network (WAN), the Internet, or an intranet.

FIG. 5 illustrates one example computing system 500 that can be used to implement the present disclosure. Other computing systems can be used as well. Computing tasks discussed herein as being performed at and/or by one or more functional unit(s) can instead be performed remote from the respective system, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Numbered Statements

1. A computer-implemented method for automatically determining the recommended security configuration of a cloud service, the method comprising:

obtaining contextual information related to the configuration and operation of a first cloud service deployed within a cloud computing network;

providing the contextual information to a prediction model, wherein the prediction model is operable to identify a security posture from input contextual information;

obtaining a recommended security posture from the prediction model, wherein the recommended security posture is based on the contextual information related to the first cloud service provided to the prediction model; and determining a security recommendation for the first cloud service based on a comparison of a current security posture of the first cloud service and the recommended security posture.

2. The computer-implemented method of statement 1 further comprising:

causing an action based on the security recommendation.

3. The computer-implemented method of statement 2 wherein the action comprises initiating one or more security measures on the first cloud service based on the security recommendation.

4. The computer-implemented method of either statement 2 or statement 3 wherein the one or more security measures include applying one or more security rules to the first cloud service.

5. The computer-implemented method of any of statements 2 to 4 wherein the one or more security measures include applying a virtual firewall to the first cloud service.

6. The computer-implemented method of any of statements 2 to 5 wherein the action comprises presenting an output based on the security recommendation.

7. The computer-implemented method of any preceding statement wherein the contextual information comprises security configuration information related to the first cloud service.

8. The computer-implemented method of any preceding statement wherein the contextual information comprises network traffic information related to network activity of the first cloud service.

10. The computer-implemented method of any preceding statement wherein the contextual information comprises health state information related to the first cloud service.

10. The computer-implemented method of any preceding statement wherein the contextual information comprises configuration information related to a current configuration of the first cloud service.

11. The computer-implemented method of any preceding statement wherein the contextual information comprises workload information related to an application or a service associated with the first cloud service.

12. The computer-implemented method of any preceding statement wherein the contextual information comprises deployment template information associated with the first cloud service.

13. The computer-implemented method of any preceding statement wherein obtaining contextual information comprises obtaining first contextual information from an agent deployed within the cloud computing network.
14. The computer-implemented method of statement 13 further comprising:
deploying the agent within the first cloud service.
15. The computer-implemented method of any preceding statement wherein obtaining contextual information comprises obtaining second contextual information from a cloud management service associated with the first cloud service.
16. The computer-implemented method of statements 14 and 15 wherein the agent is deployed within the first cloud service based at least in part on the second contextual information obtained from the cloud management service.
17. The computer-implemented method of any preceding statement further comprising:
detecting a change in the cloud computing network;
wherein the steps of providing the contextual information to the prediction model, obtaining the recommended security posture from the prediction model, and determining the security recommendation occur or reoccur in response to detecting the change.
18. The computer-implemented method of any preceding statement wherein the cloud computing network further comprises a second cloud service.
19. The computer-implemented method of statements 17 and 18 wherein the change relates to detection of the second cloud service being deployed on the cloud computing network.
20. The computer-implemented method of statements 3 and 19 wherein the one or more security measures include isolating the second cloud service.
21. The computer-implemented method of any of statements 18 to 20 wherein the contextual information comprises information related to the configuration and operation of the second cloud service.
22. The computer-implemented method of any preceding statement wherein the prediction model comprises a machine learning model trained using training data.
23. The computer-implemented method of statement 22 wherein the training data comprises contextual information and associated security postures extracted from a plurality of cloud services.
24. A computer program product comprising a computer readable medium having stored thereon computer executable code that, when executed by one or more processors, perform one or more of the steps of the method of any of statements 1-23.
25. A system comprising:
a recommendation unit comprising:
one or more processors;
a memory for storage of computer-readable data; and
computer executable code stored in the memory and executable by the one or more processors to perform one or more of the steps of the method of any of statements 1-23.
26. The system of statement 25 wherein the recommendation unit is separate from the cloud computing network.
27. The system of statement 26 wherein the recommendation unit is configured to communicate with the first cloud service by an application programming interface The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer-implemented method for automatically determining a recommended security configuration of a first cloud service deployed within a cloud computing network, the method comprising:
    detecting a change in the cloud computing network, wherein the change relates to a second cloud service being deployed within the cloud computing network;
    in response to the change being detected, obtaining contextual information related to a configuration and operation of the first cloud service, wherein the contextual information includes health state information related to one or more heartbeat response indicators associated with the second cloud service and indicative of a health state of the second cloud service;
    determining a current security posture for the first cloud service based on the contextual information;
    providing the contextual information including the health state information to a prediction model operable to identify a recommended security posture for the first cloud service from the contextual information associated with the second cloud service, wherein the prediction model comprises a machine learning model trained using training data including contextual information and associated security postures for a plurality of cloud services; and
    determining a security recommendation for the first cloud service based on a comparison of the current security posture of the first cloud service and the recommended security posture from the prediction model.

2. The method of claim 1, further comprising causing an action based on the security recommendation.

3. The method of claim 2, wherein the action comprises blocking network traffic received from the second cloud service at the first cloud service.

4. The method of claim 2, wherein the action comprises isolating the second cloud service within the cloud computing network.

5. The method of claim 2, wherein the action comprises redeploying the second cloud service.

6. The method of claim 2, wherein the action comprises presenting an output based on the security recommendation.

7. The method of claim 1, wherein the contextual information comprises network traffic information related to network activity of the first cloud service.

8. The method of claim 7, wherein the network traffic information comprises information related to network activity between the first cloud service and the second cloud service.

9. The method of claim 1, wherein obtaining contextual information comprises obtaining first contextual information from an agent deployed within the cloud computing network.

10. The method of claim 9, further comprising deploying the agent within the first cloud service.

11. The method of claim 10, wherein obtaining the contextual information comprises obtaining second contextual information from a cloud management service associated with the first cloud service.

12. The method of claim 11, wherein the agent is deployed within the first cloud service based at least in part on the second contextual information obtained from the cloud management service.

13. The method of claim 1, wherein the training data comprises contextual information and associated security postures extracted from a plurality of cloud services.

14. A computer program product for automatically determining a recommended security configuration of a first cloud service and a second cloud service deployed within a cloud computing network, the computer program product comprising computer executable code embodied in a non-transitory computer readable medium that, when executing on one or more computing devices, performs steps comprising:
    detecting a change in the cloud computing network, wherein the change relates to a second cloud service being deployed within the cloud computing network;
    in response to the change being detected, obtaining contextual information related to a configuration and operation of the first cloud service, wherein the contextual information includes health state information related to one or more heartbeat response indicators associated with the second cloud service and indicative of the health state of the second cloud service;
    determining a current security posture for the first cloud service based on the contextual information;
    providing the contextual information including the health state information to a prediction model operable to identify a recommended security posture for the first cloud service from the contextual information associated with the second cloud service, wherein the prediction model comprises a machine learning model trained using training data including contextual information and associated security postures from a plurality of cloud services;
    obtaining a recommended security posture from the prediction model, wherein the recommended security posture is based on the contextual information provided to the prediction model; and
    determining a security recommendation for the first cloud service based on a comparison of the current security posture of the first cloud service and the recommended security posture.

15. The computer program product of claim 14, wherein the training data comprises contextual information and associated security postures extracted from a plurality of cloud services.

16. A system comprising:
   a recommendation unit comprising:
      one or more processors;
      a memory for storage of computer-readable data; and
   computer executable code stored in the memory and executable by the one or more processors to perform steps comprising:
      detecting a change in a cloud computing network having a first cloud service deployed therein, wherein the change relates to a second cloud service being deployed within the cloud computing network;
      in response to the change being detected, obtaining contextual information related to a configuration and operation of the first cloud service, wherein the contextual information includes health state information related to one or more heartbeat response indicators associated with the second cloud service and indicative of the health state of the second cloud service;
      determining a current security posture for the first cloud service based on the contextual information;
      providing the contextual information including the health state information to a prediction model operable to identify a recommended security posture for the first cloud service from the contextual information associated with the second cloud service, wherein the prediction model comprises a machine learning model trained using training data including contextual information and associated security postures from a plurality of cloud services;
      obtaining a recommended security posture from the prediction model, wherein the recommended security posture is based on the contextual information provided to the prediction model; and
      determining a security recommendation for the first cloud service based on a comparison of the current security posture of the first cloud service and the recommended security posture from the prediction model.

17. The system of claim 16, wherein the recommendation unit is separate from the cloud computing network.

18. The system of claim 17, wherein the recommendation unit is configured to communicate with the first cloud service by an application programming interface.

19. The system of claim 16, wherein the steps further comprise causing an action based on the security recommendation.

20. The system of claim 16, wherein the training data comprises contextual information and associated security postures extracted from a plurality of cloud service.

* * * * *